United States Patent [19]
Chou

[11] Patent Number: 6,040,559
[45] Date of Patent: Mar. 21, 2000

[54] ELECTRIC HEAT PEN WITH SANDWICHED HEATER ELEMENT

[75] Inventor: Ammy Chou, Taipei, Taiwan

[73] Assignee: Welcome Company, Ltd., Taiwan

[21] Appl. No.: 08/821,473

[22] Filed: Mar. 21, 1997

[51] Int. Cl.⁷ .................................................. H05B 1/00
[52] U.S. Cl. ................................... 219/229; 219/228
[58] Field of Search ............................... 219/227–230, 219/221, 243, 240, 241, 535, 544, 505, 530, 540; 156/579, 515, 583.1, 583.2, 583.8, 583.9, 379.6, 499; 228/51

[56] References Cited

U.S. PATENT DOCUMENTS

| | | | |
|---|---|---|---|
| 1,656,690 | 1/1928 | Blackburn . | |
| 2,214,084 | 9/1940 | Lovice | 219/228 |
| 2,543,035 | 2/1951 | Marston et al. | 219/228 |
| 2,598,900 | 6/1952 | Frye . | |
| 3,775,588 | 11/1973 | Niehenke | 219/243 |
| 3,996,447 | 12/1976 | Bouffard et al. | 219/540 |
| 4,242,567 | 12/1980 | Carter | 219/225 |
| 4,469,549 | 9/1984 | Dietrich | 156/579 |
| 4,546,560 | 10/1985 | Granata | 219/229 |
| 4,728,779 | 3/1988 | Kotani et al. | 219/540 |
| 4,771,161 | 9/1988 | Levy et al. | 219/228 |
| 5,099,106 | 3/1992 | Biancone | 219/228 |
| 5,345,059 | 9/1994 | Wen | 219/227 |
| 5,374,806 | 12/1994 | Chou | 219/229 |
| 5,502,967 | 4/1996 | Nakagawa et al. | 219/229 |

FOREIGN PATENT DOCUMENTS

| | | | |
|---|---|---|---|
| 1031900 | 6/1953 | France | 219/227 |
| 764887 | 1/1957 | United Kingdom | 219/228 |

*Primary Examiner*—Teresa Walberg
*Assistant Examiner*—Quang Van
*Attorney, Agent, or Firm*—Jeffer, Mangels, Butler & Marmaro LLP

[57] ABSTRACT

An electric heat pen includes a pen base adapted for holding in the hand, a pen head fixedly mounted on one end of the pen base and holding a hot plate on the outside, two plate conductors and an electric heating element between the plate conductors on the inside, and a switch controlled to connect electric power supply to the electric heating element through the plate conductors, causing the electric heating element to produce heat for heating the hot plate for gold-blocking or heat sealing.

6 Claims, 4 Drawing Sheets

ELECTRIC HEAT PEN WITH SANDWICHED HEATER ELEMENT

BACKGROUND OF THE INVENTION

The present invention relates to electric heat seal apparatus, and more specifically to an electric heat pen which can be used as a hand-held heat sealing device as well as a hand-held gold-blocking press.

A variety of heat sealing apparatus have been disclosed, and have appeared on the market. Exemplars of these apparatus are seen in U.S. Pat. No. 1,650,690 entitled "HEAT PENCIL"; U.S. Pat. No. 2,598,900 entitled "HEAT SEALING DEVICE"; U.S. Pat. No. 4,469,549 entitled "HEAT SEAL APPARATUS"; U.S. Pat. No. 5,374,806 entitled "PEN BASE ELECTRIC HEAT SEALER". These apparatus are functional, however they are specifically designed for heat sealing purpose only. It is practical to utilize the heat of a heat sealing apparatus for other purposes.

SUMMARY OF THE INVENTION

It is one object of the present invention to provide an electric heat pen which can be used as a heat sealer as well as a hand-held gold-blocking press. It is another object of the present invention to provide an electric heat pen which is safe and convenient in use. A dual-purpose electric heat pen according to the present invention is comprised of a pen base, a pen head, an electric heating element, a first conductor, a second conductor, and a hot plate. The pen base is adapted to be held in the hand of a user. The pen head is fixedly fastened to one end of the pen base. The electric heating element is mounted in a receiving chamber defined within the pen head. The first conductor and the second conductor are respectively disposed in close contact with the electric heating element. The hot plate is fastened to the receiving chamber of the pen head on the outside to receive heat from the electric heating element when the first conductor and the second conductor are respectively connected to a power supply. The pen base and the pen head can have any of a variety of shapes. They are made from an electrically insulative heat resisting material for example electrically insulative heat resisting plastic. A thermochromic plastic device may be installed in the pen base at a suitable location to indicate the change of temperature of the pen base. A switch and an indicator light are respectively mounted on the pen base for power control. The indicator light can be a bulb or LED. When the switch is switched on, the electric heating element is turned on to produce heat, and the indicator light is also turned on to indicate that the electrical heating element is on. Further, the pen base has a stop flange raised around the periphery at one end adjacent to the pen head. The stop flange prohibits the user's fingers from touching the hot pen head, and suspends the pen head from the table top when the electric heat pen is lying on the table top horizontally. The electric heating element can be a positive temperature coefficient resistor element which can be conveniently obtained from the market. The heating temperature of the electric heating element can be set within the range of 150° C. to 250° C., or preferably within the range of 200° C. to 230° C.

DETAILED DESCRIPTION OF THE PREFERRED EMBODIMENT

Figure 1:
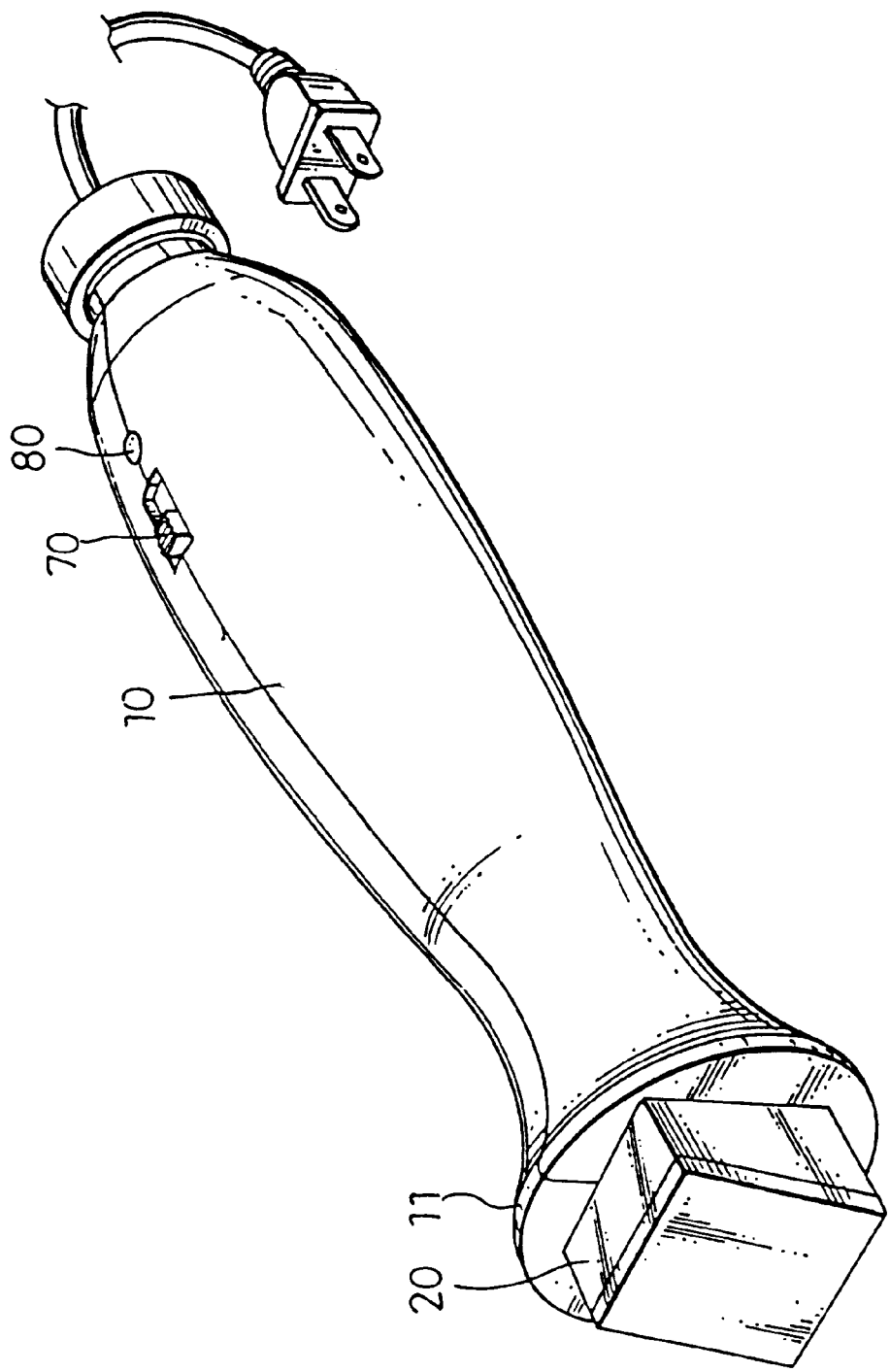
FIG. 1 is an elevational view of an electric heat pen according to the present invention.

Referring to FIG. 1, an electric heat pen in accordance with the present invention is generally comprised of a pen base 10, and a pen head 20. The pen base 10 is a hollow bar with an ON/OFF switch mounted thereon 70 and an indicator light 80, and a stop flange 11 at one end. The pen head 20 is fastened to the pen basing 10 below the stop flange 11.

Figure 2:
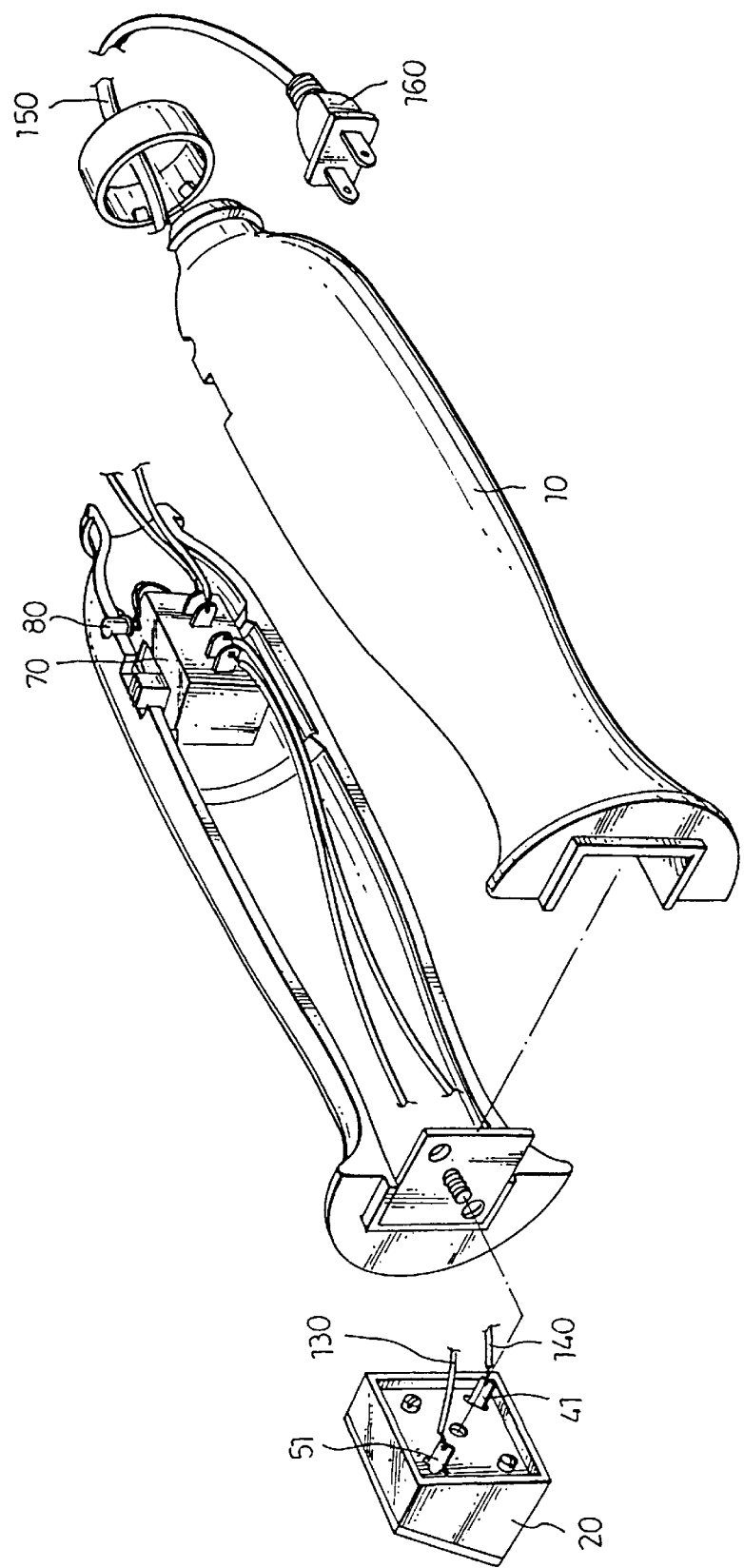
FIG. 2 is an exploded view of the pen base of the electric heat pen shown in FIG. 1.
Figure 3:
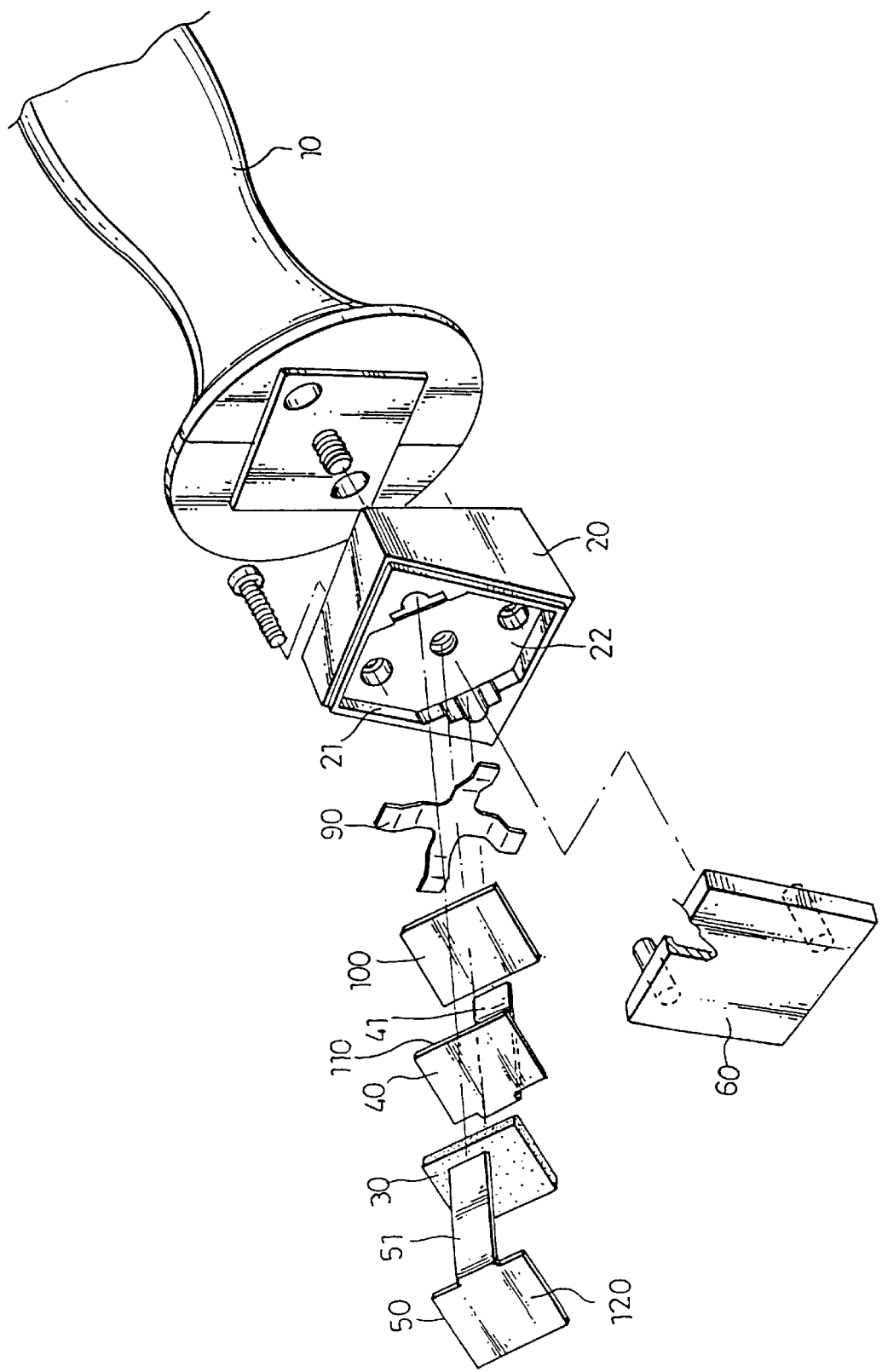
FIG. 3 is an exploded view of the pen head of the electric heat pen shown in FIG. 1.

Referring to FIGS. 2 and 3, the pen head 20 comprises a receiving chamber 21, a top cover wall 22 covering on the receiving chamber at the top side, a hot plate (heat conductive aluminum plate) 60 covering on the receiving chamber 21 at the bottom side. There are provided a spring plate 90, a steel plate 100, a first plate conductor (first electrically conductive aluminum plate) 40, a heating element 30 and a second plate conductor (second electrically conductive aluminum plate) 50 respectively mounted in the receiving chamber 21 in proper order.

Figure 4:
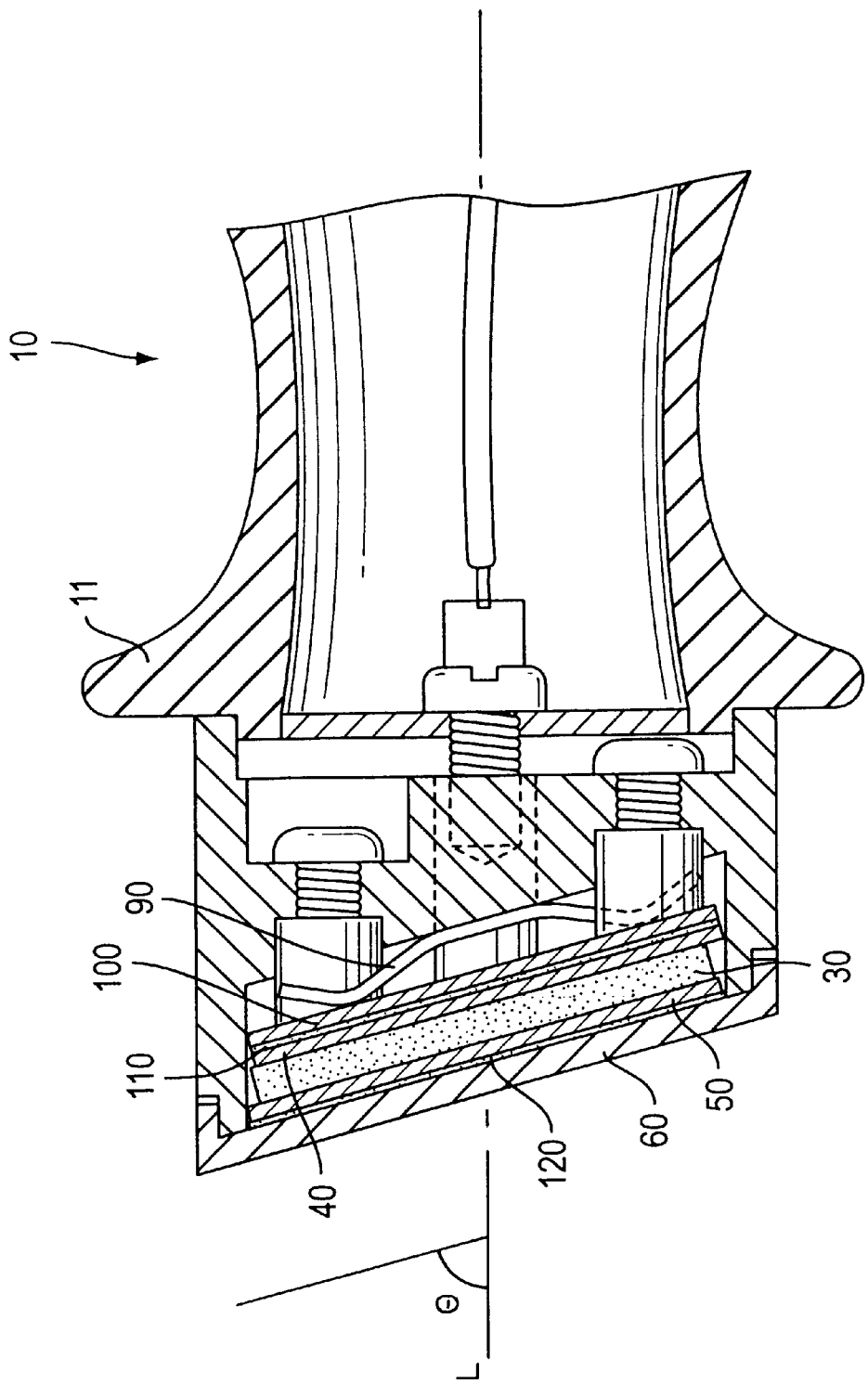
FIG. 4 is a sectional view of a part of the present invention, showing the internal arrangement of the pen head.

Referring to FIG. 4, a first electrically insulative, heat resisting film 120 is adhered to one side of the second plate conductor 50 and closely attached to the hot plate 60; a second electrically insulative, heat resisting film 110 is adhered to one side of the first plate conductor 40 and closely attached to the steel plate 100.

Referring to FIGS. 2 and 3 again, the first plate conductor 40 and the second plate conductor 50 have a respective extension strip 41and 51 respectively inserted through a respective hole in the top cover wall 22 of the pen head 20 and connected to the ON/OFF switch 70 by electric wires 130;140. The ON/OFF switch 70 is connected to an electric plug 160 outside the pen base 10 by a cable 150. Through the electric plug 160, AC power is transmitted to the electric heat pen.

Referring to FIG. 4 again, the spring force of the spring plate 90 forces the steel plate 100 downwards toward the hot plate 60, therefore the heating element 30 is firmly retained in close contact between the first plate conductor 40 and the second plate conductor 50, and heat can be efficiently transmitted from the heating element 30 to the hot plate 60 through the second plate conductor 50. The steel plate 100 is sandwiched in between the spring plate 90 and the first plate conductor 40, to evenly distribute the spring force of the spring plate 90 to the first plate conductor 40. The hot plate 60 forms a non-zero angle $\theta$ with the longitudinal axis L of the pen base 10.

The heating element 30 is a PTC (positive temperature coefficient) resistor element that produces a temperature within the range of about 200° C. to 230° C. upon the passing of electric current there through. The hot plate 60 is a square aluminum plate which receives heat from the heating element 30, and can be used for gold-blocking as well as heat sealing.

Referring to FIG. 1 again, the stop flange 11 of the pen base 10 facilitates the application of force to the pen base 10 by the user, and prohibits the user's fingers from touching the hot pen head 20. Further, when the electric heat pen is lying on the table top, the stop flange 11 suspends the pen head 20 above the table top, and therefore the pen head 20 is prohibited from touching the table top.

While only one embodiment of the present invention has been shown and described, it will be understood that various modifications and changes could be made thereunto without departing from the spirit and scope of the invention disclosed.

What the invention claimed is:

1. An electric heat pen comprising:
   a pen base adapted to be held in the hand of a user, said pen base having a longitudinal axis;
   a pen head fastened to one end of said pen base and defining a receiving chamber;
   an electric heating element mounted inside the receiving chamber of said pen head and electrically connected to produce heat;
   an upper conductor and a lower conductor respectively disposed in contact with said electric heating element, said electric heating element being actuated to produce heat when said upper conductor and said lower conductor are respectively connected to two opposite terminals of power supply; and
   a hot plate that covers said receiving chamber of said pen head and that is heated by said electric heating element, said hot plate forming a non-zero angle with said longitudinal axis of said pen base;
   wherein said receiving chamber of said pen head is covered with a top cover, and a spring plate is mounted inside said receiving chamber, and attached to said top cover to impart a downward pressure to said upper conductor against said electric heating element and said lower conductor; and
   wherein a steel plate is sandwiched in between said spring plate and said upper conductor, and an electrically insulative heat resisting film is sandwiched in between said upper conductor and said steel plate.

2. The electric heat pen of claim 1 wherein said upper conductor and said lower conductor are respectively made from heat conductive aluminum plate, and said electric heating element is a positive temperature coefficient plate resistor retained between said upper conductor and said lower conductor.

3. The electric heat pen of claim 1 wherein said hot plate is a heat conductive aluminum plate, and an electrically insulative heat resisting film is sandwiched in between said hot plate and lower conductor.

4. The electric heat pen of claim 1 wherein said pen base is mounted with a switch adapted for controlling the connection of external power supply to said upper and lower conductors, and an indicator light controlled by said switch.

5. The electric heat pen of claim 1 wherein said pen base has a stop flange raised around the periphery at one end adjacent to said pen head.

6. The electric heat pen of claim 1 wherein said pen base and said pen head are respectively made from heat resisting plastic.

* * * * *